E. RIGGS.
SPECTACLES.
APPLICATION FILED MAY 8, 1912.
1,092,290.
Patented Apr. 7, 1914.
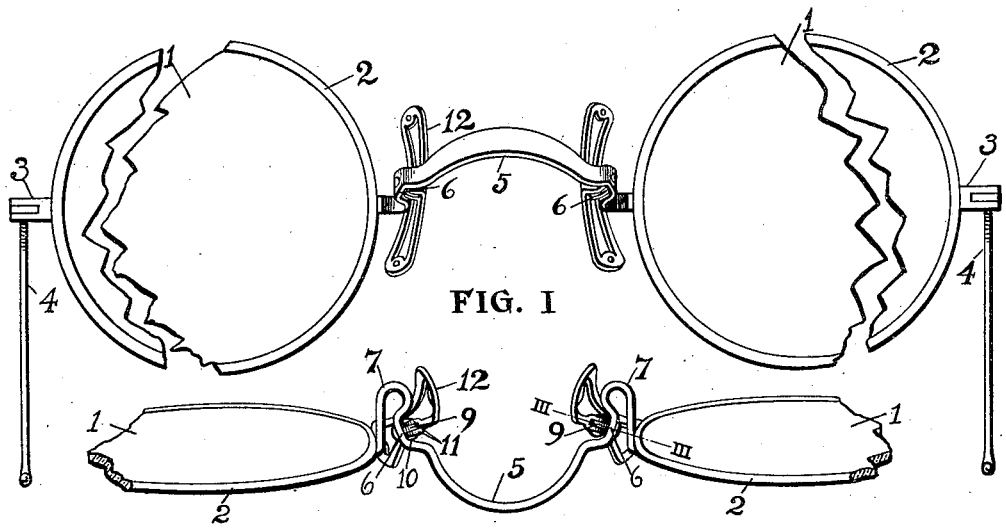
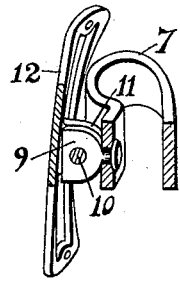
FIG. III
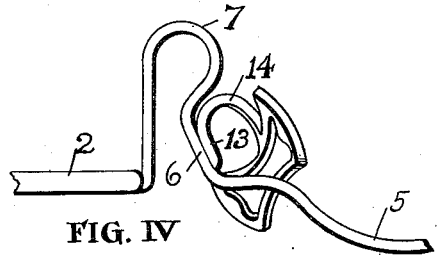
FIG. IV
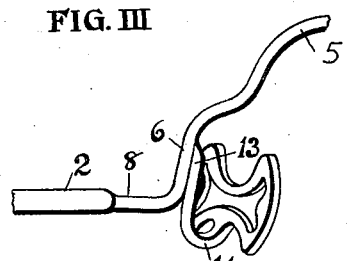
FIG. V
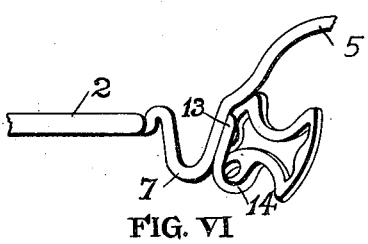
FIG. VI
WITNESSES:
Joseph J. Demers
Reginald H. Waters.
INVENTOR
ELWOOD RIGGS
By
H. H. Stylt, H. K. Parsons.
ATTORNEYS

UNITED STATES PATENT OFFICE.

ELWOOD RIGGS, OF OMAHA, NEBRASKA.

SPECTACLES.

1,092,290.  Specification of Letters Patent.  Patented Apr. 7, 1914.

Application filed May 8, 1912. Serial No. 695,892.

*To all whom it may concern:*

Be it known that I, ELWOOD RIGGS, a citizen of the United States, residing at Omaha, in the county of Douglas and State of Nebraska, have invented certain new and useful Improvements in Spectacles, of which the following is a specification.

My invention relates to improvements in spectacle mountings, and has particular reference to improved means for supporting a spectacle mounting upon the nose of the wearer thereof in such manner as to avoid undue pressure at any particular point on the nose and particularly to avoid undue pressure on the nerves lying near the surface of the bridge of the nose which are frequently irritated by the bridges of ordinary spectacle mountings.

A further object of my invention is the provision of an improved spectacle mounting so constructed as to bear on the large surface on the nose to satisfactorily distribute the weight of the mounting and which mounting shall be so constructed as to automatically cause the lenses to assume the correct position before the eyes of the wearer.

Other objects and advantages of my improved spectacle mounting will be readily apparent by reference to the following specification taken in connection with the appended drawings forming a part thereof, and it will be understood that I may make any modifications in the specific details of construction shown and described within the scope of the appended claims without departing from or exceeding the spirit of my invention.

Figure I represents a front view of a spectacle mounting embodying my improvements. Fig. II represents a plan view thereof. Fig. III represents an enlarged sectional view taken on the line III—III of Fig. II. Fig. IV represents a detail plan view illustrating an adjustable guard supporting arm. Fig. V represents a similar view of a slightly modified construction, and Fig. VI represents a view of a still further modification.

In the drawings, in which similar characters of reference are employed throughout to denote corresponding views, the numeral 1 designates the lenses of a pair of spectacles embodying my improvements, said lenses being inclosed by the frame 2 having at its outer ends the end pieces 3 to which are pivoted the usual temples 4.

Connecting the frames 2 on opposite sides of the spectacle illustrated is my improved spectacle bridge which comprises the arched or bowed central portion 5 having at each end thereof the outwardly offset portion 6 which may be either substantially U-shaped in form or may be L-shaped as desired and as may prove most satisfactory in making up individual mountings. In all of the views except Fig. V I have shown extending from the offset portion 6 the looped arm 7 which is connected at its outer end to the frame 2. Said loop 7 is made from ductile or pliable material, whereby it may be bent or twisted to adjust the pupillary distance between the lenses, the inset or outset of the lenses, or to make any other similar adjustments or combinations of adjustments. In Fig. V, however, I have shown simply a straight arm 8 connecting the offset 6 with the frame 2 but if desired this arm 8 may be made of sufficient length to permit of bending thereof to regulate the inset and outset of the lenses as will be readily understood by reference to the drawings.

In Figs. I, II and III of the drawings I have illustrated extending inward from the central portion of the offset 6 the lug 9 to which is pivotally secured by the rivet 10 the ear or ears 11 of the nose guard 12, the length of the lug 9 and ears 11 being such that the bearing face of the nose guard 12 is disposed substantially flush with the adjacent end of the bridge arch 5 as is clearly shown in the drawings. The decided advantage of this location of the guard will be hereinafter pointed out.

In Figs. IV, V and VI in place of employing the lug 9 and ear 11 for connecting the guard to the offset, the guard is formed with or has secured thereto the pliable arm 13 which is soldered or suitably attached to the bridge and has a loop 14 lying within the offset, while the guard 12 is on the inner terminal of the arm and occupies the same position relative to the portion 5 of the bridge as does the pivoted guard.

It will be understood by all those conversant with the art of eyeglass fitting that in the case of the pivoted guard shown in Figs. I, II and III the said guard will automatically swing to adjust itself to the contour of the nose of the individual wearer, the principal swing, of course, being in a substantially vertical plane, although the rivet 10 may fit into the lug 9 and ear 11 with any desired degree of looseness to permit of same twisting of the guard as well as swinging and in this twisting the front edge of the guard will slightly catch into the flesh of the nose to prevent any forward slipping and will thus aid the temples in retaining the mounting on the face.

In those forms of my invention shown in Figs. IV, V and VI the guard, of course, cannot automatically adjust itself to the face, but the pliable arm 13 and particularly its loop 14 may be readily bent or twisted to adjust the position of the guards and the guards will then always be located in this position and consequently will fit the nose at but one point which will be the correct place for the mounting to rest.

As above mentioned, the bearing face of the guard is substantially flush with the adjacent portion of the bridge. This result is attainable on account of the offset 6 at the ends of the bridge, the guards spanning and satisfactorily closing the inner end of the offset as is clearly shown in the drawings. By being constructed in this manner my mounting possesses a most decided advantage over anything hitherto known in the art, in that the central portion 5 of the bridge rests upon the nose of the wearer and aids in supporting the weight of the mounting and in securing the correct positioning thereof, while the guards at the ends of the bridge proper or bearing portion 5 being substantially in line with or forming continuations of the bridge afford broad bearing surfaces adapted to rest upon the bony part of the nose to support the main weight of the mounting and yet said broad parts while being disposed in line with the ends of the bridge to form practically continuations or enlargements thereof, are so arranged that their position may be readily varied according to the contour of the nose of the individual wearer, while the fact that the said guards are made separate from and are attached to the rest of the mounting is of great advantage in that various styles of guards may be fitted to the same bridge according to the desires or requirements of the individual wearer.

From the foregoing description taken in connection with the accompanying drawings, the construction and advantages of my improved form of spectacle mounting should be readily apparent to all, and it will be seen that I have provided a mounting which is simple in construction and extremely satisfactory in operation and which will serve to support itself on the nose of the wearer without undue pressure at any particular point but will evenly distribute the said pressure and by bearing in a band around the nose can be so adjusted as to fit at but one certain point on the nose and will thus insure the exact correct position of the lenses which is of extreme importance in the case of prisms or other lenses having astigmatic correction.

I claim:

1. The combination with a bridge having offset portions, of supporting arms carried by the bridge and located within the offsets, and guards carried by the arms and disposed substantially in alinement with the inner face of the bridge.

2. In a spectacle mounting, the combination with a bridge having a central portion adapted to rest on the nose of the wearer, of offset portions formed in the bridge adjacent the bearing portion, and nose guards pivotally secured to said offset portions.

3. A bridge of the character described comprising a central arched portion having an adjustable loop at each end thereof and offset portions formed in the arched portion of the bridge.

4. A bridge of the character described comprising a central arched portion having an adjustable loop at each end thereof and offset portions formed in the arched portion of the bridge, and guard supporting arms secured to and disposed within said offset portions of the bridge.

In testimony whereof I affix my signature in presence of two witnesses.

ELWOOD RIGGS.

Witnesses:
G. M. MATTSON,
M. H. WESIN.

---

Copies of this patent may be obtained for five cents each, by addressing the "Commissioner of Patents, Washington, D. C."